United States Patent
Menke et al.

(10) Patent No.: US 7,552,827 B2
(45) Date of Patent: Jun. 30, 2009

(54) SYSTEMS AND METHODS OF SEPARATING MANURE FROM A MANURE AND BEDDING MIXTURE

(75) Inventors: Thomas Menke, Greenville, OH (US); David Ricke, Greensburg, IN (US)

(73) Assignee: Envirolytic Technologies, LLC, Centerville, OH (US)

( * ) Notice: Subject to any disclaimer, the term of this patent is extended or adjusted under 35 U.S.C. 154(b) by 99 days.

(21) Appl. No.: 11/548,044

(22) Filed: Oct. 10, 2006

(65) Prior Publication Data

US 2008/0083659 A1    Apr. 10, 2008

(51) Int. Cl.
*B03B 5/00* (2006.01)
*B03B 5/60* (2006.01)

(52) U.S. Cl. .................. 209/156; 209/155; 209/157; 209/158

(58) Field of Classification Search ............... 209/155, 209/156
See application file for complete search history.

(56) References Cited

U.S. PATENT DOCUMENTS

| | | | |
|---|---|---|---|
| 2,073,952 A * | 3/1937 | Shepherd ............... 209/155 |
| 3,437,487 A * | 4/1969 | Mason ................. 426/335 |
| 3,746,553 A * | 7/1973 | Anderson .............. 426/286 |
| 3,950,562 A | 4/1976 | Senior |
| 3,956,126 A | 5/1976 | Streebin et al. |
| 4,018,899 A | 4/1977 | Seckler et al. |
| 4,250,023 A | 2/1981 | Samis et al. |
| 4,338,337 A | 7/1982 | Frankl |
| 4,369,194 A | 1/1983 | Arosvic |
| 4,391,623 A | 7/1983 | Knepper |
| 4,721,569 A | 1/1988 | Northrop |
| 5,015,421 A | 5/1991 | Messner |
| 5,078,882 A | 1/1992 | Northrop |
| 5,472,472 A | 12/1995 | Northrop |
| 5,538,529 A | 7/1996 | Northrop |
| 5,593,600 A | 1/1997 | Solomon |
| 5,601,703 A * | 2/1997 | Szymocha et al. ........ 209/164 |
| 5,626,644 A | 5/1997 | Northrop |
| 5,628,912 A | 5/1997 | Nesseth |
| 5,639,371 A | 6/1997 | Loy et al. |
| 5,720,393 A * | 2/1998 | Wedel et al. ............ 209/13 |

(Continued)

OTHER PUBLICATIONS

Baker, James C., "Lagoon Design and Management for Livestock Waste Treatment and Storage" Water Quality & Waste Management, North Carolina Cooperative Extension Service, No. EBAE 103-83, Mar. 1996.

(Continued)

*Primary Examiner*—Patrick H Mackey
*Assistant Examiner*—Terrell H Matthews
(74) *Attorney, Agent, or Firm*—Dinsmore & Shohl LLP

(57) ABSTRACT

Systems and methods configured to continuously separate manure and bedding comprise a vertical housing without screens, grates, or filters therein, a manure and bedding inlet port coupled to the side of the housing, and a water inlet port coupled to the side of the housing. The system further comprises at least one inlet flow controller. Upon separation of the bedding and manure, the housing comprises a manure outlet port disposed on its upper portion and configured to output a product stream comprising separated manure and water. The housing further comprises a bedding outlet port disposed on its lower portion and configured to output a product stream comprising separated bedding and water.

15 Claims, 3 Drawing Sheets

U.S. PATENT DOCUMENTS

| | | | |
|---|---|---|---|
| 5,746,910 A * | 5/1998 | Negeri | 209/168 |
| 5,755,852 A | 5/1998 | Northrop | |
| 5,811,011 A | 9/1998 | Ciszczon et al. | |
| 5,853,585 A | 12/1998 | Nesseth | |
| 5,906,774 A | 5/1999 | Loy | |
| 5,950,839 A | 9/1999 | Wedel | |
| 5,957,301 A | 9/1999 | Wedel et al. | |
| 6,007,720 A | 12/1999 | Tomita | |
| 6,039,874 A | 3/2000 | Teran et al. | |
| 6,054,044 A | 4/2000 | Hoffland et al. | |
| 6,071,418 A | 6/2000 | Tai | |
| 6,082,548 A | 7/2000 | Stephenson et al. | |
| 6,103,123 A | 8/2000 | Gantzer | |
| 6,190,566 B1 | 2/2001 | Kolber | |
| 6,193,889 B1 | 2/2001 | Teran et al. | |
| 6,227,379 B1 | 5/2001 | Nesseth | |
| 6,234,323 B1 | 5/2001 | Sarrouh | |
| 6,254,775 B1 | 7/2001 | McElvaney | |
| 6,299,774 B1 | 10/2001 | Ainsworth et al. | |
| 6,346,240 B1 | 2/2002 | Moore, Jr. | |
| 6,368,508 B1 | 4/2002 | Gatz et al. | |
| 6,368,849 B1 | 4/2002 | Norddahl | |
| 6,372,146 B1 | 4/2002 | Verdegaal et al. | |
| 6,398,959 B1 | 6/2002 | Teran et al. | |
| 6,426,005 B1 * | 7/2002 | Larsson | 210/650 |
| 6,470,828 B1 | 10/2002 | Townsend et al. | |
| 6,517,714 B2 | 2/2003 | Streat | |
| 6,531,057 B1 | 3/2003 | Houle | |
| 6,569,332 B2 | 5/2003 | Ainsworth et al. | |
| 6,663,782 B2 | 12/2003 | Morse et al. | |
| 6,689,274 B1 | 2/2004 | Northrop et al. | |
| 6,689,277 B2 | 2/2004 | Streat | |
| 6,773,594 B1 | 8/2004 | van der Wijngaart | |
| 6,773,595 B2 | 8/2004 | Gantzer | |
| 6,783,677 B1 | 8/2004 | Irani | |
| 6,811,701 B2 | 11/2004 | Wilkie | |
| 6,854,342 B2 * | 2/2005 | Payne et al. | 73/861.79 |
| 6,860,997 B1 | 3/2005 | Frederick et al. | |
| 6,863,181 B2 | 3/2005 | Dias | |
| 6,953,123 B2 * | 10/2005 | Niitti | 210/388 |
| 7,153,436 B2 * | 12/2006 | Bair et al. | 210/709 |
| 2002/0030012 A1 | 3/2002 | Sullivan et al. | |
| 2002/0056690 A1 | 5/2002 | Wegner | |
| 2002/0079266 A1 | 6/2002 | Ainsworth et al. | |
| 2002/0121486 A1 | 9/2002 | Verdegaal et al. | |
| 2003/0075501 A1 | 4/2003 | Wilkie | |
| 2004/0011734 A1 | 1/2004 | Cha et al. | |
| 2004/0050777 A1 | 3/2004 | Khan | |
| 2004/0065611 A1 | 4/2004 | Jones | |
| 2004/0079698 A1 | 4/2004 | Northrop et al. | |
| 2004/0084064 A1 * | 5/2004 | Verderosa et al. | 134/10 |
| 2004/0154982 A1 | 8/2004 | Irani | |
| 2004/0154988 A1 | 8/2004 | Sheets, Sr. | |
| 2004/0159608 A1 | 8/2004 | Hoffland | |
| 2005/0000906 A1 | 1/2005 | Blais et al. | |
| 2005/0167359 A1 | 8/2005 | Wilkie | |
| 2005/0242025 A1 | 11/2005 | Stock | |

OTHER PUBLICATIONS

Bion, "various pages from http://www.biontech.com/technology/index.html" Bion Environmental Technologies, Inc.

Norweco.com "Identification of Wastewater Organisms" http:www.morweco.com/html/lab/Identify.htm.

Rich, Linvil G., "Aerated Lagoon Technology" Clemson University Environmental Engineering & Science, http://www.ces.clemson.edu.ees/rich/technotes/.

Rich, Linvil G., "Effluent BOD5—A Misleading Parameter for the Performance of Aerated Lagoons Treating Municipal Wastewaters" Aerated Lagoon Technology, Technical Note No. 1, Clemson University Environmental Engineering & Science, http://www.ces.clemson.edu/ees/rich/technote1.html.

Rich, Linvil G., "Facultative Lagoons: A Different Technology" Aerated Lagoon Technology, Technical Note No. 8, Clemson University Environmental Engineering & Science, http://www.ces.clemson.edu/ees/rich/technotes/technote8.htm.

Farm Pilot Project Coordination, Inc., "Technologies for Nutrient Management, Dairy Projects" http://fppcinc.org/dairy.htm.

"Tru-Grit Manure Sand Saver", Parkson Corporation, 2006, pp. 1-2.

* cited by examiner

SYSTEMS AND METHODS OF SEPARATING MANURE FROM A MANURE AND BEDDING MIXTURE

FIELD OF THE INVENTION

The present invention is directed to separating manure from a mixture of manure and animal bedding, via systems and methods comprising flow controlled vertical separators.

BACKGROUND OF THE INVENTION

The use of inorganic materials, such as sand, in bedding for cows is widely known, because the sand bedding is better for the health of the cows than organic bedding materials. With traditionally used organic materials, such as chopped straw, sawdust or wood shavings, bacteria growth on these materials is prevalent, and can negatively affect the health of the cows. Sand does not promote bacteria growth like these organic materials, and therefore produces improved udder health, increased cow comfort, cleaner cows, improved traction and lower cost, etc. Furthermore, sand does not degrade like organic materials. One drawback to the use of sand is the significant handling and storage problems associated with the resulting manure and sand mixture. The sand in the mixture degrades mechanical equipment used in processing, handling, and/or storing the manure. For instance, sand obstructs the pumps normally used to transfer manure and to irrigate the manure suspension onto the surrounding ground surface. Consequently, sand must be separated before the manure can be further processed. To achieve the goals of improved cow health and longer equipment life, there is a need for improved systems and methods of separating manure from the animal bedding materials especially sand bedding.

SUMMARY OF THE INVENTION

According to one embodiment of the present invention, a system configured to continuously separate manure from a mixture of manure and bedding is provided. As defined herein, "bedding" includes any suitable inorganic or organic bedding material known to one of ordinary skill in the art, wherein the bedding particles have a greater density then the manure particles. In one exemplary embodiment, the bedding material may comprise sand. The system comprises a vertical housing comprising no screens, grates, or filters therein, at least one manure and bedding inlet port coupled to the side of the housing, at least one water inlet port coupled to the side of the housing. The manure and bedding inlet port is configured to deliver a mixture comprising manure and bedding to the housing, and the water inlet port is configured to feed a stream comprising input water to the housing. As used herein, the "manure and bedding" refers to compositions comprising substantially solid mixtures of bedding and manure. For example, and not by way of limitation, the manure and bedding may include a moisture content of about 20% or greater. "Water" or "input water" as defined herein, includes recycled water, treated water, untreated water, clean water, or combinations thereof. For example, it is contemplated that "water" includes storm water from run-off ponds. The system also comprises at least one inlet flow controller configured to regulate a flow rate of the manure and bedding mixture, the input water stream, or both. The system comprises at least one manure outlet port disposed on the upper portion of the housing, and at least one bedding outlet port disposed on the lower portion of the housing. As defined herein, "upper portion" refers to the region of the housing above the manure and bedding inlet port, whereas "lower portion" refers to the region of the housing below the water inlet port. The "upper portion" and "lower portion" may include the top, bottom or sides of the housing, as long as the "upper portion" is above the manure and bedding inlet port and the "lower portion" is below the water inlet port. The manure outlet port is configured to output a product stream comprising separated manure and water, and the bedding outlet port is configured to output a product stream comprising separated bedding and water.

According to another embodiment of the present invention, a system configured to continuously separate manure and bedding is provided. The system comprises a vertical housing comprising no screens, grates, or filters therein, at least one manure and bedding inlet port coupled at a specific position to the side of the housing, and at least one water inlet port coupled to the side of the housing at a specific position below the manure and bedding inlet port. The manure and bedding mixture inlet port is configured to deliver a stream comprising manure and bedding to the housing, and the water inlet port is configured to deliver a stream of input water to the housing. The system also comprises at least one water inlet flow controller comprising a programmable logic controller configured to allow a user to set a target flow rate for the input water stream and is further configured to regulate the flow rate of the input water stream in order to maintain a specific volume ratio of input water to manure and bedding mixture input. The system comprises at least one manure and bedding inlet flow controller, wherein the controller comprises a pump comprising a plurality of pump speed settings. The pump is configured to raise or lower a flow rate of the manure and bedding stream by adjustment of the pump settings in order to maintain a specific volume ratio of input water to manure and bedding mixture input. The system further comprises at least one manure outlet port disposed on the upper portion of the housing and a bedding outlet port disposed on the lower portion of the housing. The manure outlet port is configured to output a product stream comprising separated manure and water, and the bedding outlet port is configured to output a product stream comprising separated bedding and water.

According to yet another embodiment of the present invention, a method of separating bedding from manure is provided. The method comprises providing a vertical housing, feeding a stream comprising manure and bedding to the housing, and feeding a stream comprising input water to the housing. The method further comprises mixing the manure and bedding stream with the input water stream, and separating bedding from the manure by having the bedding settle to the bottom of the housing, without screening or filtering inside the housing.

Additional features and advantages provided by the systems and methods of manure separation will be more fully understood in view of the following detailed description, in conjunction with the drawings

BRIEF DESCRIPTION OF THE DRAWINGS

The following detailed description of the illustrative embodiments of the present invention can be best understood when read in conjunction with the following drawings, where like structure is indicated with like reference numerals and in which.

DETAILED DESCRIPTION

Figure 1:
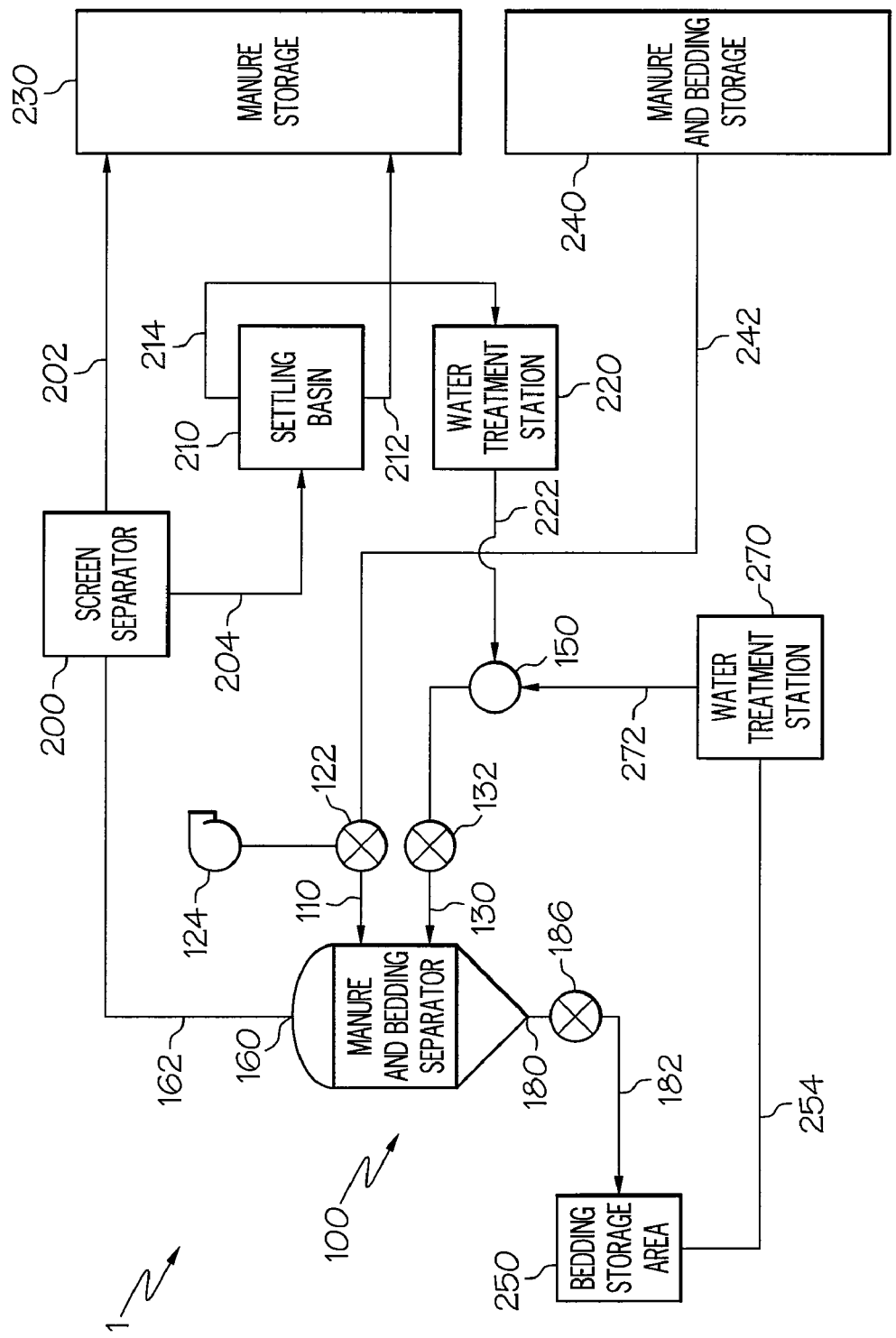
FIG. 1 is a schematic illustration of the system of separating bedding and manure according to one or more embodiments of the present invention.

Referring to FIG. 1, a system 1 configured to continuously separate manure and from a manure and bedding mixture 110 is provided. To improve efficiency and eliminate time lags, the system 1 utilizes a continuous process, not a batch process. The system 1 comprises a vertical housing 100 having various suitable shapes and dimensions suitable to accomplish bedding separation. In the exemplary embodiments of FIGS. 1-3, the vertical housing 100 defines a substantially cylindrical shape comprising a height of about 12 feet and a diameter of about 24 inches. The vertical housing 100 defines an open mixing area and does not comprise screens, gratings, or filters therein. Furthermore, the housing 100 does not utilize air to fluidize the materials in the housing 100.

Figure 2:
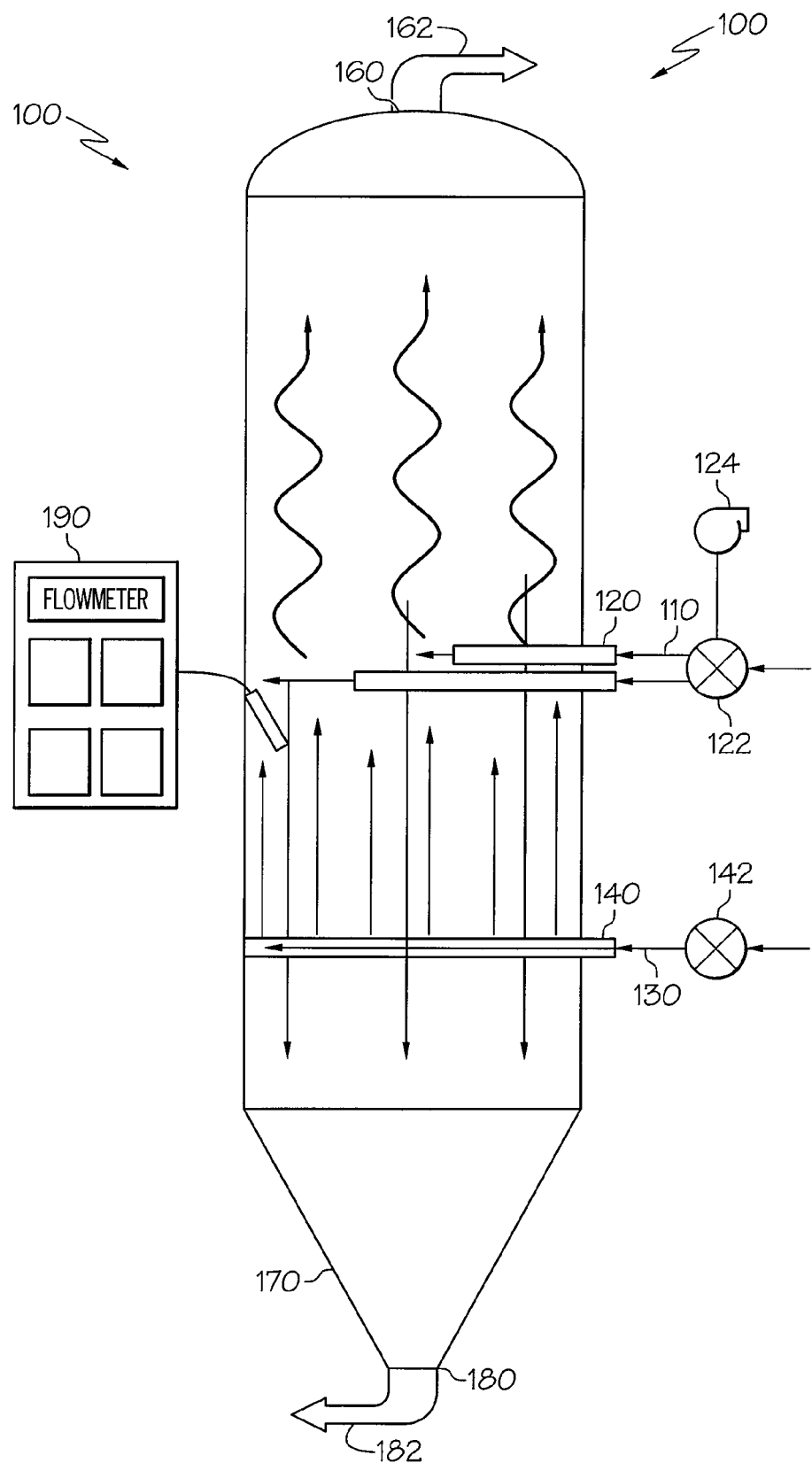
FIG. 2 is a schematic illustration of a vertical separator according to one or more embodiments of the present invention.
Figure 3:
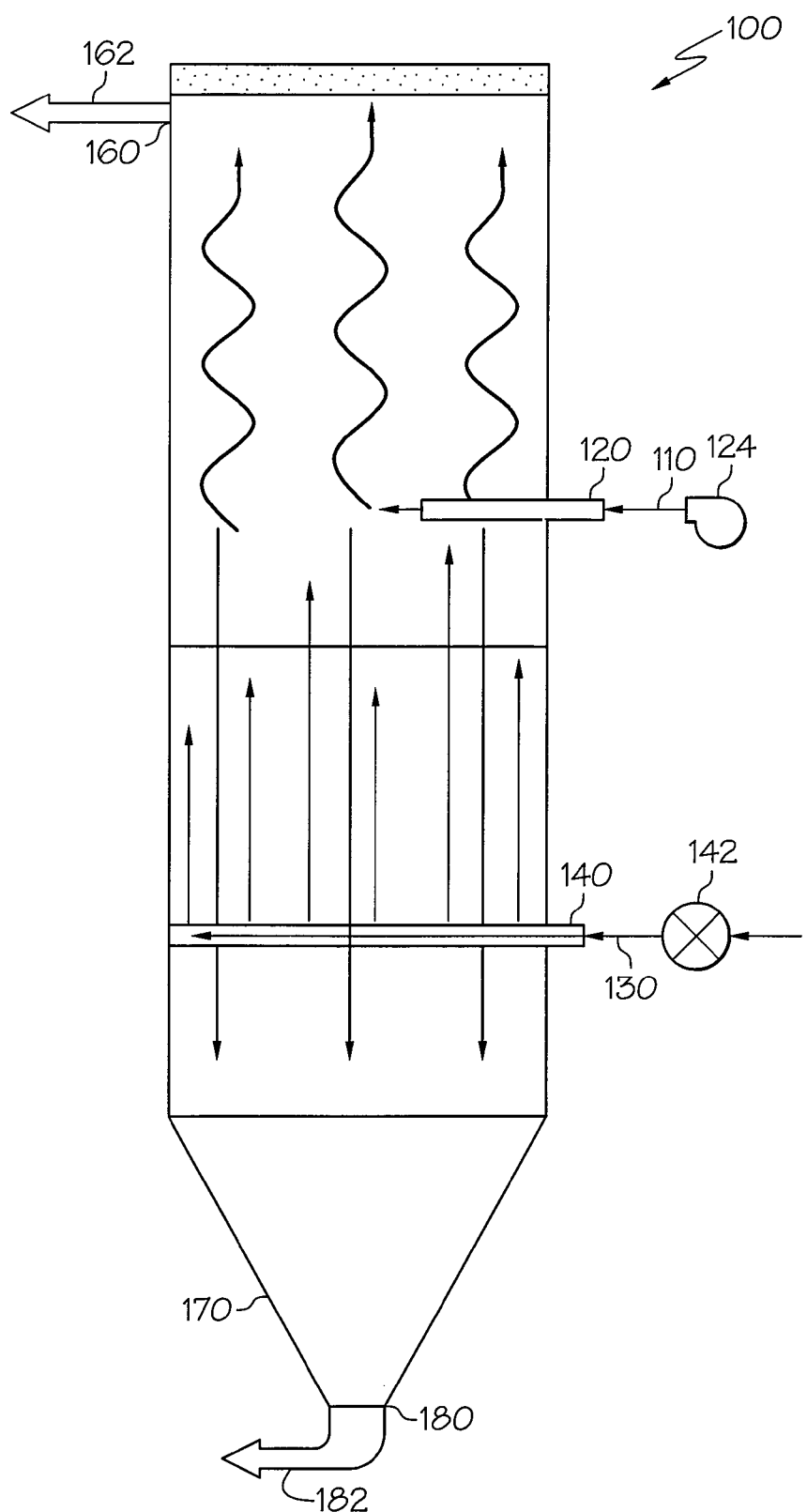
FIG. 3 is another schematic illustration of a vertical separator according to one or more embodiments of the present invention.

Referring to FIGS. 2 and 3, the housing 100 comprises a plurality of feed ports disposed on the side of the housing 100, and having various dimensions as known to one skilled in the art in order to maximize manure separation by having manure and bedding contact the inlet water. One of the feed ports is a manure and bedding inlet port 120 disposed along the side of the housing at specific positions and configured to feed a stream comprising manure and bedding 110 to the housing 100. The manure and bedding inlet port 110 may comprise one or more openings for delivering the manure and bedding inlet 110 to the housing 100. In a couple exemplary embodiments, the housing may comprise two or more inlets for larger capacity systems as in FIG. 2, or may comprise one inlet as in FIG. 3. The housing 100 also comprises a water inlet port 140 disposed along the side of the housing 100 and configured at a specific location and outlet positioning to deliver a stream in an upward direction comprising water 130 to the housing 100. In the exemplary embodiments of FIGS. 2 and 3, the water inlet port 140 is disposed at a calculated distance to maximize separation below the manure and bedding inlet port 120 and above the lower region 170 of the housing wherein the bedding settles out from the manure and bedding mixture.

The housing 100 also comprises outlet ports located at the upper and bottom portions of the housing 100. Referring to FIG. 2, the housing 100 may comprise a manure outlet port 160 disposed on the top of the housing 100 and a bedding outlet port 180 disposed on the bottom of the housing 100. In another embodiment as shown in FIG. 3, the housing 100 may comprise a manure outlet port 160 disposed on the side of the upper portion of the housing 100 and a bedding outlet port 180 disposed on the bottom of the housing 100. The manure and bedding inlet port 120 feeds manure and bedding 110 into the housing 100, and the water inlet port 140 delivers input water 130 into the housing 100. Upon delivery to the housing 100, the manure and sand 110 mixes with the water 130. In one embodiment, the water 130 is fed in excess over the manure and sand 110, and thereby produces a primarily liquid solution inside the housing. Manure particles are less dense than sand particles, consequently, the sand sinks to the bottom of the liquid solution. As a result, the sand particles flow downwardly and settle to the bottom of the housing 100, and thereby force the manure particles to flow upwardly to the top of the housing 100.

Subsequently, the separated bedding and water 182 at the bottom of the housing are outputted from the housing 100 through the bedding outlet port 180, whereas the separated manure and water 162 is outputted from the housing through the manure outlet port 160. In a further embodiment of the invention, the housing 100 comprises a funnel shaped zone 170 extending downwardly to the bedding outlet port 180 at the lower portion of the housing 100. Separated bedding 182 accumulates in this zone 170 prior to flowing out of the housing 100 through the bedding outlet port 180. The amount of water 130 and the amount of manure and bedding 110 fed to the housing 100 depends on the manure processing requirements of individual manufacturing facilities, dairies, etc. As stated above, the water 130 may be fed in excess of the manure and bedding 110; however, various flow ratios are contemplated herein. The system may utilize an inlet water to inlet manure/bedding ratio ranging from about 1:1 to about 20:1 depending on various factors, for example, cleanliness of bedding and water available for separation. At the same time, the bottom bedding/water outlet may be configured for a specific outlet flow of bedding and water 182 to balance against a specific outlet flow of manure and water 162. In one exemplary embodiment, 100 gallons per minute of manure and bedding 110 is fed to the housing 100, wherein 200 gallons per minute of input water 130 is fed to the housing 100. Upon mixing and separation, the housing 100 may output 250 gallons per minute of separated manure and water 162 and 50 gallons per minute of separated bedding plus water 182. Other volume ratios that is adjusted to maximize separation efficiencies depending upon the input water and input manure and bedding mixture.

The system 1 also comprises at least one inlet flow controller 122, 142 responsive its settings, or in a further embodiment, responsive to a flow meter. Referring to FIG. 2, the flow meter 190 may be coupled to the pump delivering manure to the housing 100; however, the meter 190 may also be arranged at least partially inside the housing 100. The flow meter 190 may comprise any suitable device operable to test the volumetric flow rate of material entering and/or exiting the housing 100. The inlet flow controller 122, 142 may comprise various control components known to one of ordinary skill in the art. In one embodiment, the inlet flow controller 122, 142 comprises a valve. In another embodiment, the inlet flow controller 122, 142 may comprise a programmable logic controller (PLC) configured to allow a user to set a target flow rate as well as regulate the flow rate of the manure and bedding stream, the water stream, or both. In yet another embodiment, the inlet flow controller comprises a pump 124 comprising a plurality of pump settings. The pump 124 enables a user to raise or lower the flow rate of the manure and bedding stream, the water stream, or both through adjustment of the pump settings. The pump 124 may include any suitable pump known to one of ordinary skill in the art. The pump 124 is effective at delivering viscous materials, such as the manure and bedding 110, to the housing 100. Combinations of these flow controllers are also contemplated herein. For example, and not by way of limitation, a PLC controller sets a target flow rate of 200 gallons per minute of water 130 entering the housing 100; however, the flow meter 190 detects a flow rate of 225 gallons per minute. Upon receiving this reading from the flow meter 190, the PLC may lower the flow rate by lowering the pump speed, or partially closing a valve to allow less water to flow. As would be familiar to one of ordinary skill in the art, it is possible to adjust pump volumes of both manure and water inlet pumps manually while physically monitoring the output results to achieve the desired results.

In another exemplary embodiment as shown in FIG. 1, the manure and bedding inlet port 120 is coupled to a pump 124 and an inlet flow controller 122, and the water inlet port 130 140 is coupled to a programmable logic controller 142. Similarly, the housing 100 may, in a further embodiment, also comprise at least one outlet flow controller coupled to one or multiple outlet ports. Referring to the embodiment of FIG. 1, the bedding outlet port 180 is coupled to a flow controller 186, which regulates the flow of bedding and water flowing out of the housing 100. The controllers on the outlet ports may comprise valves, pump, PLC's or combinations thereof.

After separating the bedding from the manure in the housing, the system 1 may, in further embodiment, comprise additional processing steps for the separated bedding and manure. For example, upon exiting the housing 100, the manure and water stream 162 may be fed to another separator, for example, a screen separator 200 comprising a screen filter as shown in FIG. 1 or another type of solid separator, such as a screw or belt press. The screen separator 200 is configured to filter out manure particles in the manure and water product stream 162. The screen separator 200 filters out manure 202 having particle sizes larger than the openings in the screen filter, and outputs the manure to a manure storage area 230. In an exemplary embodiment, the filtered out manure may comprise particle sizes of about 0.6 to about 1.7 mm. In an alternative embodiment, the non-filtered manure 204, or filtered manure effluent, which comprises smaller particle sizes and water, may be fed to a settling tank or basin 210. Due to the specific gravity differential, the settling basin 210 separates the manure from the water by allowing the heavier portions of manure 212 to settle to the bottom of the settling basin 210, and then outputs the manure 212 to the manure storage area 230. The manure storage area 230 holds the manure until it is packaged, used, sold, etc. The remaining water 214 from the settling basin 210 may then be treated in a water treatment station or lagoon 220 and recycled back to the housing 100 for further use. By recycling, the system 1, and housing 100 does not have to generate as much net system liquid volume.

In further embodiments, the system 1 may also comprise processing steps for the bedding and water 182 exiting the bedding outlet port 180 of the housing 100. The bedding and water 182 may be fed to bedding drainage station 250, for example, a bedding drainage tank or basin, wherein the water 254 is removed from the bedding and is outputted to a water treatment station 270, or back to the same station, or lagoon 220. The water 254 is typically drained off from the bedding. A heating element may be used to accelerate the drying of the water in the bedding. After the water is drained off by gravity, the bedding, especially inorganic bedding bedding, may be reused. The water treatment station 270 treats the water 254 and then recycles the treated water 272. In a further exemplary embodiment, the treated water 272 may be delivered to the settling basin 210 to capture finer bedding not yet captured, then delivered to water treatment station 220, and then delivered back to the housing 100 for further use. Although two water treatment stations 220, 270 are shown in FIG. 1, it is contemplated that water streams 214 and 254 could both be fed to the same water treatment station before being recycled to the housing 100. In further embodiments, the treated water streams 272 and 222 may be joined at a stream junction 150, or may be fed separately to the housing 100.

For additional detail on manure and waste water treatment, U.S. Publication Number 20060065595 is incorporated in its entirety by reference. Additional system 1 components are contemplated and considered within the scope of the present invention. For instance, aerators, anaerobic digesters, additional pumps, mixers, and other components familiar to one of ordinary skill in the art may be added to the present system without deviating from the spirit and scope of the present invention.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A system configured to continuously separate manure from a mixture of manure and bedding, wherein the system comprises:
   a vertical housing comprising no screens, grates, or filters therein;
   at least one manure and bedding inlet port disposed along the side of the housing and configured to deliver a stream comprising manure and bedding directly into the housing;
   at least one water inlet port disposed along the side of the housing and configured to feed a stream of input water to the housing;
   at least one inlet flow controller coupled to the housing and configured to regulate a flow rate of the manure and bedding stream, the input water stream, or both;
   at least one manure outlet port disposed on the upper portion of the housing and configured to output a product stream comprising separated manure and water; and
   at least one bedding outlet port disposed on the lower portion of the housing and configured to output a product stream comprising separated bedding and water.

2. A system according to claim 1 further comprising at least one flow meter configured to measure an actual flow rate of material, wherein the flow controller is responsive to the flow meter.

3. A system according to claim 1 wherein the water inlet port is disposed below the manure and bedding inlet port and above the lower region of the housing wherein the bedding settles out from the manure and bedding stream.

4. A system according to claim 1 wherein the inlet flow controller comprises a programmable logic or manual controller configured to allow a user to set a target flow rate as well as regulate the flow rate of the manure and bedding stream, the input water stream, or both.

5. A system according to claim 1 wherein the inlet flow controller comprises a valve.

6. A system according to claim 1 wherein the inlet flow controller comprises a pump comprising a plurality of pump settings for raising or lowering the flow rate of the manure and bedding stream, the input water stream, or both through adjustment of the pump settings.

7. A system according to claim 1 further comprising at least one outlet flow controller coupled to the manure outlet port, the bedding outlet port, or both.

8. A system according to claim 1 further comprising a screen separator comprising a screen filter configured to separate a portion of the manure in the manure and water product stream exiting the manure outlet port.

9. A system according to claim 8 further comprising a settling basin configured to substantially separate the remaining manure by allowing the manure to settle to the bottom of the settling basin.

10. A system according to claim 1 further comprising a water treatment station configured to treat the water exiting either the manure outlet port, the bedding outlet port, or both, before feeding the water to the housing.

11. A system according to claim 1 further comprising a bedding drainage station configured to remove water from the bedding and water product stream exiting the bedding outlet port.

12. A system configured to continuously separate manure from a mixture of manure and bedding, wherein the system comprises:

a vertical housing comprising no screens, grates, or filters therein;

at least one manure and bedding inlet port disposed along the side of the housing and configured to feed a stream comprising manure and bedding directly into the housing;

at least one water inlet port disposed below the manure and bedding inlet port along the side of the housing and configured to feed a stream of input water to the housing;

at least one water inlet flow controller coupled to the housing, and comprising a programmable logic or manual controller configured to allow a user to set a target flow rate for the input water stream and further configured to regulate the flow rate of the input water stream;

at least one manure and bedding inlet flow controller coupled to the housing and comprising a pump comprising a plurality of pump speed settings, the pump being configured to raise or lower a flow rate of the manure and bedding stream by adjustment of the pump settings;

at least one manure outlet port disposed on the upper portion of the housing and configured to output a product stream comprising separated manure and water; and at least one bedding outlet port disposed on the lower portion of the housing and configured to output a product stream comprising separated bedding and water.

13. A system according to claim 12 further comprising a bedding outlet flow controller coupled to the bedding outlet port of the housing.

14. A system according to claim 1 wherein the vertical housing does not include a mechanism for providing air to the housing.

15. A system according to claim 12 wherein the vertical housing does not include a mechanism for providing air to the housing.

* * * * *